(12) United States Patent
Blumenthal

(10) Patent No.: US 6,917,207 B1
(45) Date of Patent: Jul. 12, 2005

(54) DOUBLE TIME-CONSTANT FOR ELECTROSTATIC DISCHARGE CLAMPING

(75) Inventor: Jeffrey M. Blumenthal, Austin, TX (US)

(73) Assignee: Legerity, Inc., Austin, TX (US)

( * ) Notice: Subject to any disclaimer, the term of this patent is extended or adjusted under 35 U.S.C. 154(b) by 8 days.

(21) Appl. No.: 10/745,382

(22) Filed: Dec. 22, 2003

(51) Int. Cl.[7] ........................... G01R 27/26; H02H 9/00

(52) U.S. Cl. ......................................... 324/677; 361/56

(58) Field of Search ................................. 324/457, 537, 324/676–679, 710–713; 561/56, 111, 91.1–91.3; 702/182–183

(56) References Cited

U.S. PATENT DOCUMENTS

2004/0109271 A1 * 6/2004 Takeda ........................ 361/56

* cited by examiner

Primary Examiner—Vincent Q. Nguyen
(74) Attorney, Agent, or Firm—Williams, Morgan & Amerson, P.C.

(57) ABSTRACT

A method and apparatus is provided for clamping of an electrostatic discharge using multiple time-constants. A rise in a voltage level is detected. A first time-constant is provided to determine whether the rise in the voltage level is caused by an electrostatic event. A clamping function is provided to clamp the voltage level in response to a determination that the rise in the voltage level is caused by the electrostatic event. A second time-constant is provided to provide a time period for maintaining the clamping function for a period of time to substantially extinguish the electrostatic event.

33 Claims, 6 Drawing Sheets

DOUBLE TIME-CONSTANT FOR ELECTROSTATIC DISCHARGE CLAMPING

BACKGROUND OF THE INVENTION

1. Field of the Invention

This invention relates generally to telecommunications, and, more particularly, to providing a multiple time-constant circuit for performing electrostatic discharge clamping.

2. Description of the Related Art

In communication systems, particularly telephony such as a Plain Old Telephone System (POTS), it is common practice to transmit signals between a subscriber station and a central switching office via a two-wire, bi-directional communication channel. A line card generally connects the subscriber station to the central switching office. The functions of the line card include supplying talk battery, performing wake-up sequences of circuits to allow communications to take place, and the like. Voltage signals are processed and conditioned when being driven onto telecommunication lines. These communication systems employ various electronic devices. Today's state of the art electronics provide for various circuits that may be implemented onto a single integrated circuit chip. Often, many electronic components are generally placed on an integrated circuit device. As technology improves in the area of processing of semiconductor devices, more electronic functions and devices are implemented onto integrated circuit chips.

One problem associated with handling and operating electronic devices, such as integrated circuit chips, includes protecting the devices from electrostatic discharge (ESD). Electrostatic discharges may cause various problems on electronic devices. For example, a large electrostatic may cause a sufficient energy spike in various circuitry of the electronic device such that damage to certain portions of the device may occur. In order to reduce the possibility of damage in electronic devices due to electrostatic discharges, designers have implemented various ESD protection circuitries in electronic devices. One such circuit is illustrated in FIG. 1.

Turning now to FIG. 1, a prior art ESD clamping circuit 100 is illustrated. The ESD clamping circuit 100 of FIG. 1 generally comprises a clamping device 110, an inverter circuit 120, and a charging circuit 130. The charging circuit 130 may comprise a high resistance pull-up 140 and a capacitance circuit 160. Field-effect transistors, such as MOSFETs may be employed in the clamping device 110, the inverter circuit 120 and the charging circuit 130. Upon an occurrence of an ESD event, a Vdd signal 150 (positive voltage supply) may experience a rapid and large rise in voltage. Initially, when the Vdd signal 150 experiences a positive-voltage event, such that its voltage rises rapidly, a first node 155 in the charging circuit 130 generally remains at a potential of SVss 170 (substrate ground voltage-level) and also at the same potential relative to a potential of Vss 180 (the ground voltage-level). This is true because of the gate capacitance of various MOSFETs in the charging circuit 130.

During the positive-voltage event, the Vdd signal 150 will start to climb and then the inverter circuit 120 becomes active once the Vdd signal 150 rises above a threshold voltage of the inverter circuit 120. The first node 155 will then be held at the Vss potential signal 180, which will cause the voltage level of a second node 125 to begin to climb. The second node 125 will climb up to the level of the Vdd signal 150, which is at this point beyond the threshold voltage, thereby activating the clamping device 110. The clamping device 110 clamps the voltage experienced by the clamping circuit 100.

The activation of the clamping device 110 occurs when the Vdd signal 150 has a relatively fast rise time. At this point, the clamping device 110 will be activated and minimize further increases in the Vdd signal 150. Generally, a small amount of current will flow through the high resistance pull-up circuit 140, which may be a weak P-channel device. Therefore, that small current will require a substantial amount of time to charge up the first node 155. When the first node 155 becomes charged up to the threshold of the inverter circuit 120, the inverter circuit 120 becomes deactivated, which prompts the second node 125 to transition. This causes the deactivation of the clamping device 110, thereby turning off the clamping function of the circuit 100.

One problem associated with the implementation shown in FIG. 1 is that the clamping function may be inadvertently triggered by a normal power-on event that has a fast rise time but does not exceed normal operation voltages. Among the problems associated with triggering an ESD clamp upon a power up sequence includes interferences with power-on sequences, a possible reduction in the reliability of the ESD clamps, and/or occurrence of unintended device behavior, such as device latch-up due to large clamp currents. Another problem associated with the implementation shown in FIG. 1 is that the deactivation of the clamping function may occur (i.e., turning the clamping circuit 100 clamping function off) before a desirable time because the ESD event may not be completely extinguished before the clamping function is deactivated. Therefore, the electronic device hosting the circuit 100 may become damaged.

The present invention is directed to overcoming, or at least reducing the effects of, one or more of the problems set forth above.

SUMMARY OF THE INVENTION

In one aspect of the present invention, a method is provided for performing clamping of an electrostatic discharge using multiple time-constants. A rise in a voltage level is detected. A first time-constant is provided to determine whether the rise in the voltage level is caused by an electrostatic event. A clamping function is provided to clamp the voltage level in response to a determination that the rise in the voltage level is caused by the electrostatic event. A second time-constant is provided to provide a time period for maintaining the clamping function for a period of time to substantially extinguish the electrostatic event.

In another aspect of the present invention, an apparatus is provided for performing clamping of an electrostatic discharge using multiple time-constants. The apparatus of the present invention includes a first time-constant circuit that is adapted to detect an electrostatic event based upon a rise in a voltage level. The apparatus also includes an inverter circuit that is operatively coupled to the first time-constant circuit. The first time-constant circuit is adapted to toggle the inverter circuit in response to detecting the electrostatic event. A clamping device of the apparatus is operatively coupled to the inverter. The clamping device is adapted to clamp the voltage level in response to the toggling of the inverter circuit. The apparatus of the present invention also includes a second time-constant circuit that is operatively coupled to the inverter circuit. The second time-constant circuit is adapted to toggle the inverter circuit to cause the inverter circuit to de-activate the clamping device after a period of time for substantially extinguishing the electrostatic event.

In yet another aspect of the present invention, an apparatus is provided for performing clamping of an electrostatic discharge using multiple time-constants. The apparatus of the present invention includes a first time-constant circuit that is adapted to detect an electrostatic event based upon a rise in a voltage level. The apparatus also includes an inverter circuit that is operatively coupled to the first time-constant circuit. The first time-constant circuit is adapted to toggle the inverter circuit in response to detecting the electrostatic event. A clamping device of the apparatus is operatively coupled to the inverter. The clamping device is adapted to clamp the voltage level in response to the toggling of the inverter circuit. The apparatus of the present invention also includes a second time-constant circuit that is operatively, coupled to the inverter circuit. The second time-constant circuit is adapted to toggle the inverter circuit to cause the inverter circuit to de-activate the clamping device after a period of time for substantially extinguishing the electrostatic event. The apparatus of the present invention also comprises a threshold device that is operatively coupled to the inverter circuit. The threshold device is adapted to provide a higher voltage-rise requirement of the voltage level for the inverter circuit to activate the clamping device.

BRIEF DESCRIPTION OF THE DRAWINGS

The invention may be understood by reference to the following description taken in conjunction with the accompanying drawings, in which like reference numerals identify like elements, and in which.

Figure 1:
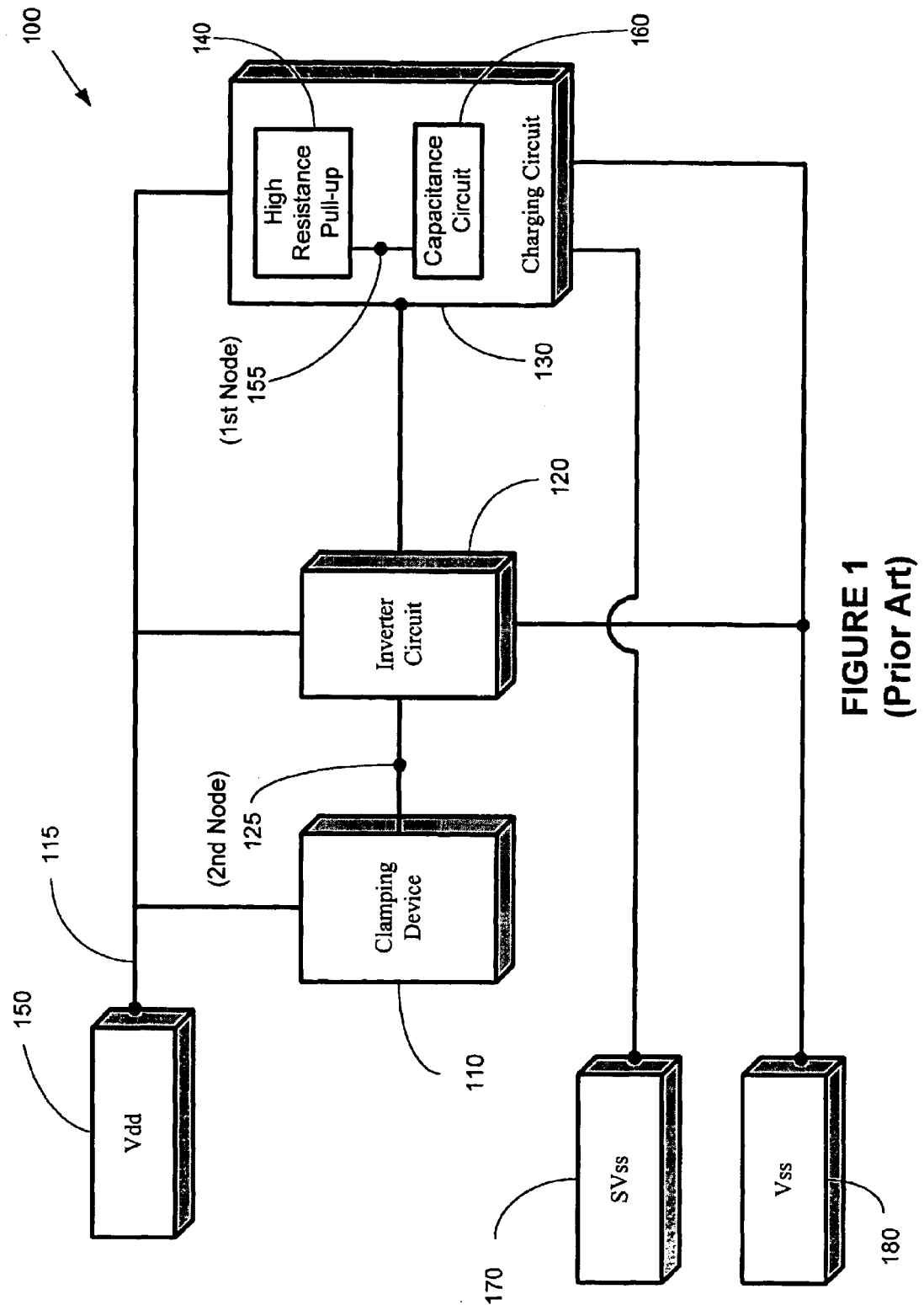
FIG. 1 illustrates a block diagram depiction of a prior art implementation of an electrostatic discharge protection circuit.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Embodiments of the present invention provide for an electrostatic discharge method and apparatus for providing a plurality of time-constants for implementing protection from electrostatic discharge (ESD) events. ESD events may include, but are not limited to, exposure to electrostatic energy in the environment, exposure to electrostatic energy from human contact, exposure to electrostatic energy from energy received through wires coupled to an electronic device, etc. Generally, the ESD events disclosed in the present invention refer to positive ESD events. Embodiments of the present invention provide for discriminating between a fast rising ESD event and a relatively slow rising power-up event, which may also be seen by prior art circuits as an ESD event. Embodiments of the present invention provide for employing a double-time-constant circuit for detecting an ESD event and holding the clamping of the ESD circuit to an appropriate amount of time to substantially extinguish the ESD energy signal or pulse.

Figure 2:
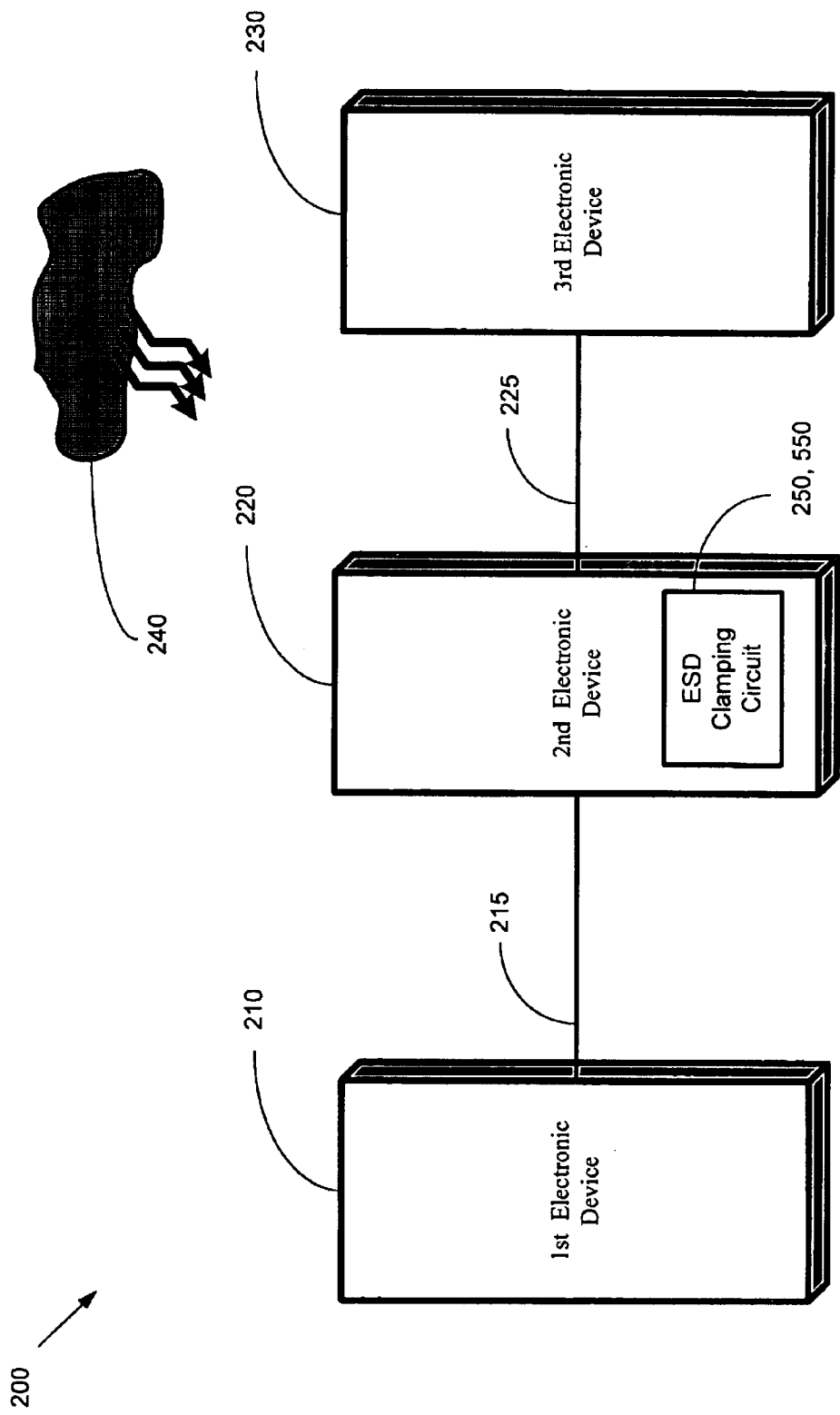
FIG. 2 illustrates a block diagram depiction of an electronic device that includes an electrostatic discharge circuit in accordance with one embodiment of the present invention.

Turning now to FIG. 2, a system 200 in accordance with embodiments of the present invention is illustrated. FIG. 2 illustrates a first electronic device 210, which is coupled to a second electronic device 220 via a line 215. The second electronic device 220 may also be connected to a third electronic device 230 via a line 225. The second electronic device 220 may comprise an ESD clamping circuit 250 that may comprise ESD clamping circuitry that includes multiple time-constants. An electrostatic energy source 240 may cause an electrostatic discharge (ESD) event in the first, second and third electronic devices 210, 220, 230.

Alternatively, the electrostatic energy source 240 may cause a large buildup of ESD charge on the lines 215 and/or 225, thereby causing an ESD event to be experienced by the second electronic device 220. Additionally, the first, second and/or third electronic devices 210, 220, 230 may be "hot plugged," such that a power-up sequence may be experienced by the electronic devices 210, 220, 230. An ESD clamping circuit 250 is capable of discriminating between a fast rising ESD event and a relatively slow rising power-on event and adjusting the time period upon which the clamping function is active. Therefore, the ESD clamping circuit 250 is able to provide proper clamping to extinguish an ESD event/pulse but still allow for power-up without interference from accidental activation of the ESD clamping and/or excessive clamping time periods.

Figure 3:
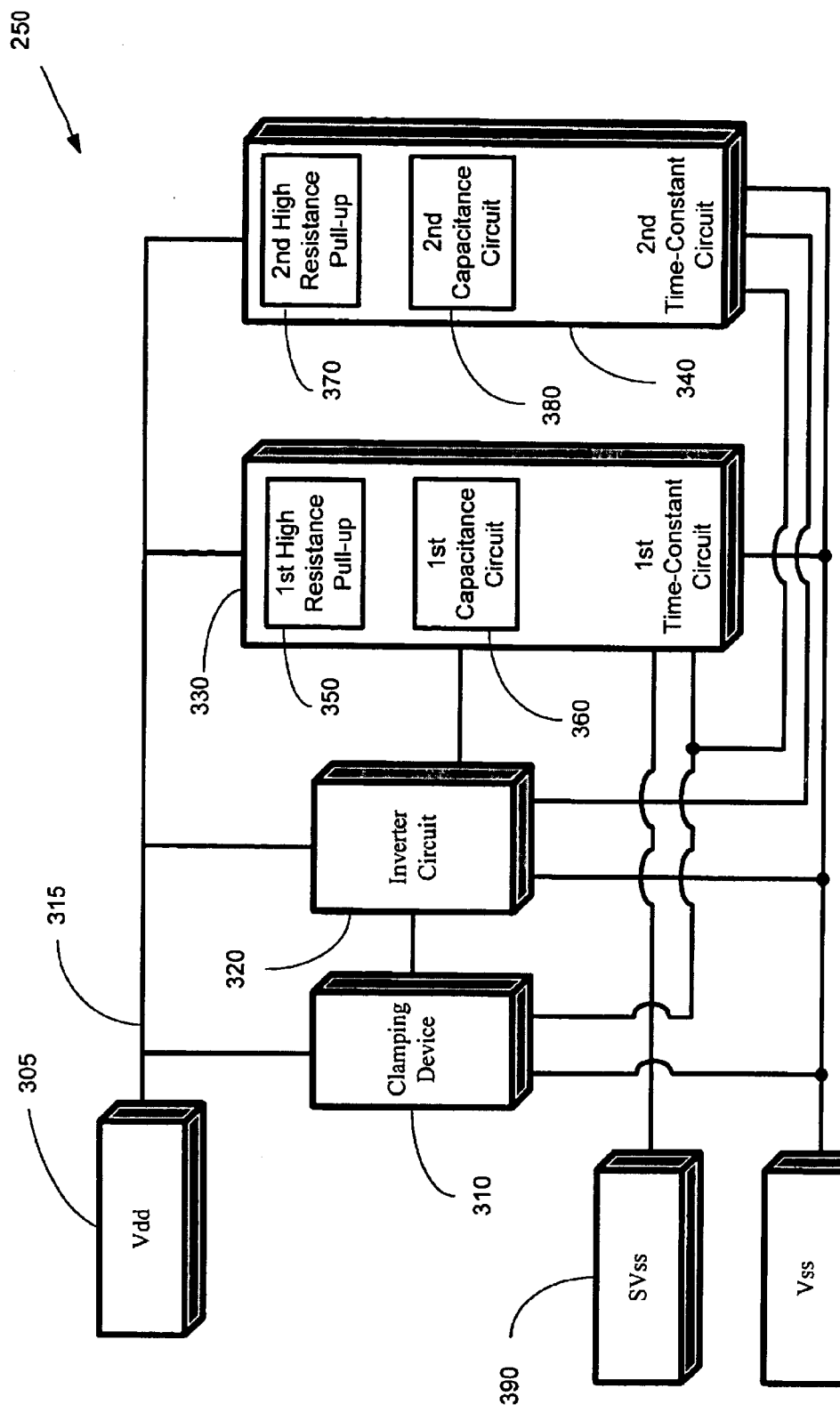
FIG. 3 illustrates a more detailed block diagram depiction of the electrostatic discharge circuit of FIG. 2, in accordance with one embodiment of the present invention.

Turning now to FIG. 3, a block diagram depiction of the ESD clamping circuit 250 is illustrated. The ESD clamping circuit 250 comprises a clamping device 310 to provide a clamping function to clamp the voltage experienced by the ESD clamping circuit 250. The ESD clamping circuit 250 also comprises an inverter circuit 320, a first time-constant circuit 330, and a second time-constant circuit 340. The first time-constant circuit 330 may comprise a first high resistance pull-up circuit 350 and a first capacitance circuit 360. The second time-constant circuit 340 may comprise a second high resistance pull-up circuit 370 and a second capacitance circuit 380. In one embodiment, the second time-constant circuit 340 is capable of detecting an ESD event and distinguishing between an ESD event and a fast-rise power-up sequence (e.g., hot plugging). The first time-constant circuit 330 is capable of holding the clamping function to a proper duration to extinguish an ESD pulse or event.

As a result of either an ESD event or due to a power-up sequence (e.g., the power-up of the second electronic device 220), a Vdd signal 305 on a line 315 experiences a relatively rapid rise in voltage. FIG. 3 also shows a SVss (substrate ground-level voltage) 390 and an Vss signal 395 (ground-level voltage). The first and second time-constant circuits 330, 340 both detect the rapid rise in the voltage level on the line 315 (Vdd signal 305) relative to the SVss and the Vss signals 390, 395. The first and second time-constant circuits 330, 340 are coupled to the inverter circuit 320 in order to activate or de-activate the clamping device 310. In one embodiment, the clamping device 310 is a large current drive (large width to length ratio) N-channel MOSFET device. A signal from the inverter circuit 320 controls the clamping device 310, thereby activating or de-activating the clamping function of the ESD clamping circuit 250. The first time-constant circuit 330 prompts the activation of the clamping function based upon a detection of an ESD event, while not allowing the activation of the clamping function if a power-up sequence is detected. The second time-constant circuit 340 provides the inverter circuit 320 with the ability to control the duration of the clamping function, thereby substantially extinguishing an ESD event regardless of the duration of the first time-constant circuit charging time.

Figure 4:
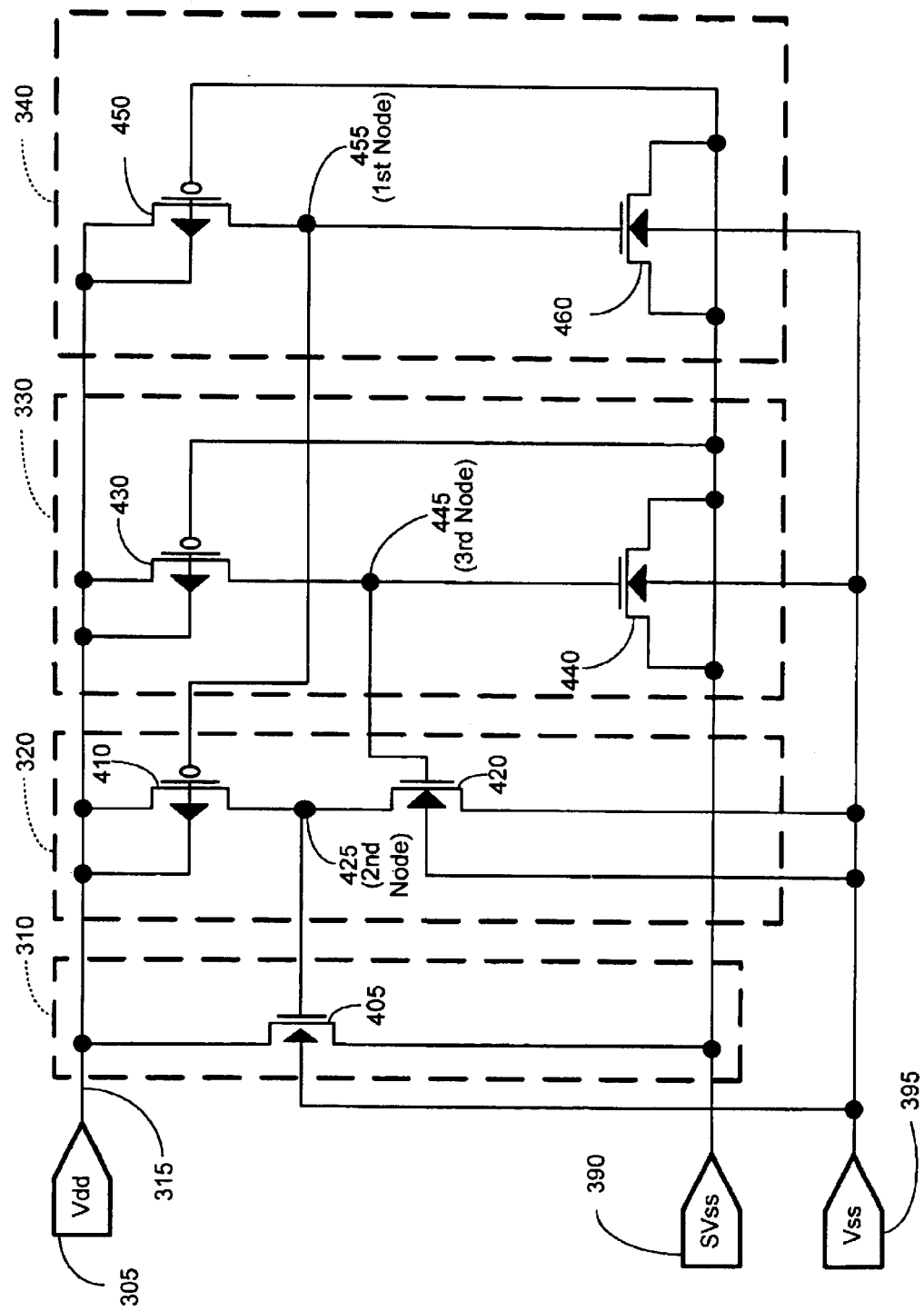
FIG. 4 illustrates a circuit diagram of the electrostatic discharge circuit of FIG. 3, in accordance with one embodiment of the present invention.

Turning now to FIG. 4, a circuit implementation 400 of one embodiment of the ESD clamping circuit 250 is illustrated. The operation of the clamping device 310, which comprises an N-channel transistor 405, is influenced by the operation of the inverter circuit 320, which comprises a P-channel transistor 410 and an N-channel transistor 420. The drain of the P-channel transistor 410 is coupled to the drain of the N-channel transistor 420. The intersection of the drain terminals of the transistors 410 and 420 provide a second node 425. The signal on the second node 425 enables or disables the clamping function by controlling the operation of the N-channel transistor 405.

The first time-constant circuit 330 includes a relatively weak P-channel pull-up transistor 430, the drain terminal of which is pulled up to the Vdd signal 305 on the line 315. The first time-constant circuit 330 also comprises a capacitance circuit 360, which comprises a transistor 440. The second time-constant circuit 340 comprises a relatively weak P-channel pull-up transistor 450 that is pulled up to the line 315. Additionally, the second time-constant circuit 340 comprises a second capacitance circuit 380, which comprises a transistor 460. If an ESD event occurs, the ESD clamping circuit 250 experiences the ESD event and the Vdd signal 305 rises quickly relative to a first node 455 initially uncharged at the logic low level of SVss 390 and Vss 395.

When the Vdd signal 305 rises quickly due to the ESD event, the first and second capacitance circuits 360, 380 will initially be discharged. The first node 455 is held low due to the capacitive circuits 360 and 380 (440 and 460). As a result, the transistor 410 in the inverter circuit 320 is biased "on." Conversely, the transistor 420 in the inverter circuit 320 is biased "off" because a third node 445 would still be uncharged. The transistor 410 is biased "on" and will generally pull up the second node 425 to a logic high level, which biases the clamping device 310 (transistor 405) "on" thereby enabling the clamping function.

After the clamping function has been turned "on" and the value of Vdd 305 is above the threshold voltage, the second time-constant circuit 340 will start to trickle current down the drain of transistor 450 and onto the gate terminal of transistor 460 in the second time-constant circuit 340. The time-constant for the second time-constant circuit 340 is such that the rise in the current due to the ESD event is trickled out relatively quickly. Therefore, the first node 455 rises relatively rapidly as compared to the third node 445 due to the larger time-constant of the first time-constant circuit 330. The first node 455 rises up to logic high and turns "off" the transistor 410 since it is connected to the gate terminal of the P-channel transistor 410. However, the second node 425 has already been pulled up high enough to activate the clamping device 310, enabling the clamping function. So, turning off the transistor 410 does not affect the second node 425 from activating the clamp so the clamping function stays on even though the transistor 410 has been turned off.

The second time-constant circuit 340, which comprises the transistors 450 and 460, in combination, is used to determine the startup and the activation of the clamping function. The second time-constant circuit 340 determines how fast an edge (of the rapid rise of a voltage level on the line 315) is required to turn on the clamping function. In one embodiment, once the clamping function is activated by the device 310, it will generally stay "on" indefinitely until the N-channel device 420 is turned "on". This would cause the second node 425 to discharge, which turns "off" the clamping function by turning "off" the clamping device 310. Once the time-constant circuit 340 has activated the clamp 310, the first time-constant circuit 330 may take effect. The first time-constant circuit's 330 function is to turn off the clamping device 310 after the charging time is determined by the devices 430 and 440. The first time-constant is provided by the first time-constant circuit 330. The transistor 430 is generally a much weaker pull-up transistor as compared to the analogous transistor 450 in the second-time-constant circuit 340. Additionally, the capacitance provided by the transistor 440 is larger than the capacitance provided by the transistor 460. Therefore, the first time-constant circuit 330 provides a larger time-constant as compared to the time-constant provided by the second time-constant circuit 340. The first time-constant is larger and therefore allows the clamping function to stay on for long enough to fully discharge an ESD event.

In the case where there is a "hot-plugging" or a "hot-socket" event, which results in slower rise of Vdd 305 on the line 315, the rising edge is generally not as fast as an ESD event as a result of the capacitance or inductance in the line 315. A hot-plugging event generally refers to an action when a circuit board (e.g., a printed circuit (PC) board) comprising an integrated circuit is plugged into a backplane or other receptacle with Vdd supply voltage already established. A hot-socket event generally refers to an action when a circuit board containing a receptacle for an integrated circuit (IC) device already has Vdd supply voltage established when an IC device is inserted into the IC device receptacle.

Utilizing embodiments of the present invention, the ESD clamping circuit 250 will not treat voltage rise due to a hot-plugging or a hot-socket event, as an ESD event. In this case, it is desirable that the ESD clamping function of the circuit 400 is not activated. In the event of a hot plugging or a hot socket event where a relatively slower rise of Vdd 305 occurs (compared to the ESD event), the first and third nodes 455, 445 are initially discharged when the level of Vdd 305 rises above threshold voltage. The transistor 450 then begins trickling current into the capacitor device 460. If the rise in the Vdd 305 is slow enough, then the device 460 starts to charge up the first node 455 and therefore, the transistor 410 does not experience enough threshold voltage drop between Vdd (on the line 315) and the first node 455, to be able to turn "on." Therefore, the device 410 is not capable of pulling up the second node 425 to logic high.

Since the second node 425 is not pulled up to logic high, the clamping device 310 will not become activated. Additionally, the clamping function is not inadvertently activated later even if the second node 425 were to be pulled up by parasitic capacitances or resistances since the second node 425 would be actively pulled down by the transistors 430 and 440 acting on transistor 420 after the third node 445 has charged up high enough to bias the transistor 420 "on". Therefore, utilizing the circuit 400 provided in FIG. 4, the ESD charging device 250 is capable of discriminating between an ESD event and a hot-plugging or hot-socket rise in power. Therefore, the discrimination made by the ESD clamping circuit 250 is such that the clamping function is only activated for an ESD event and the clamping function is maintained until the ESD event is discharged.

Figure 5:
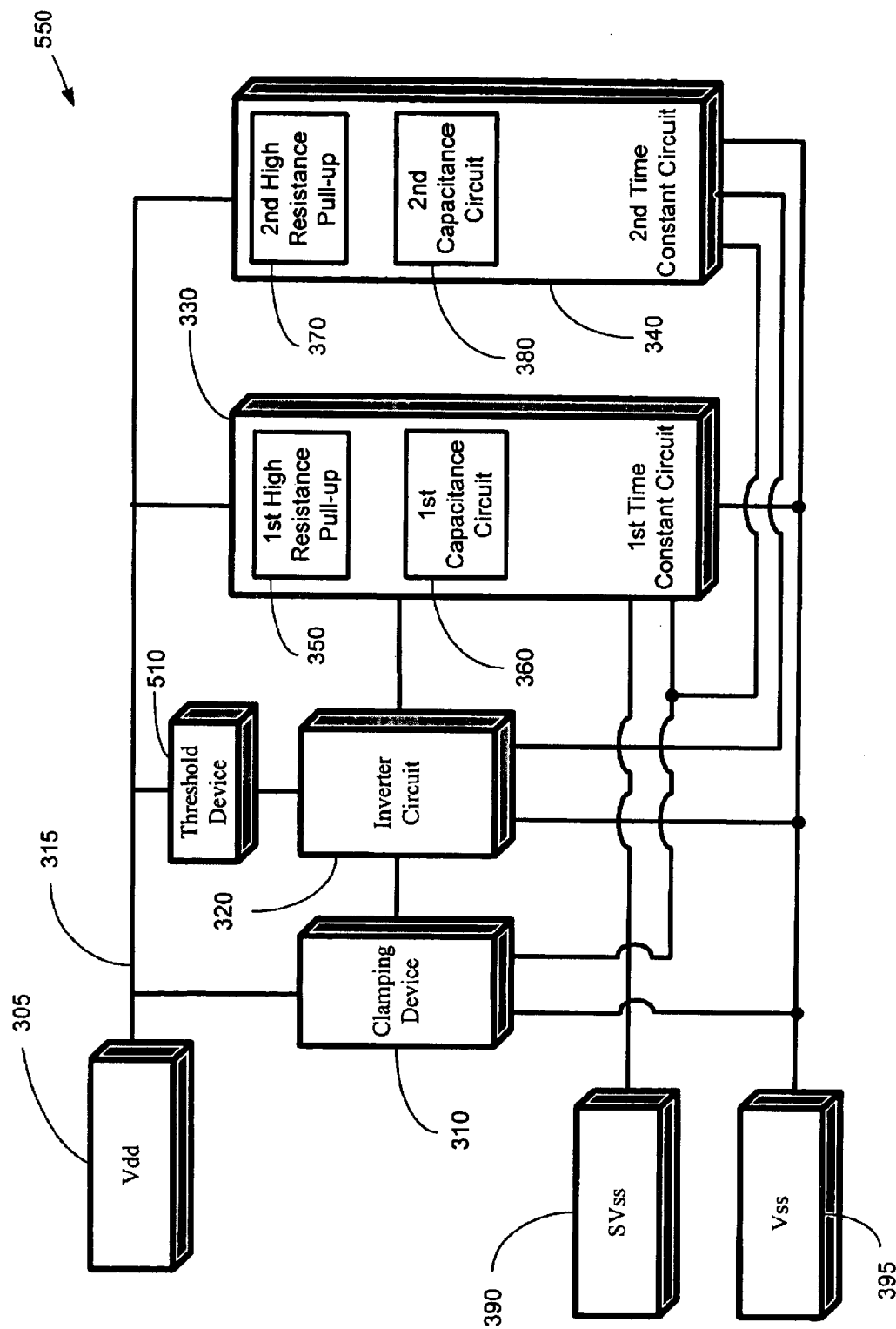
FIG. 5 illustrates a more detailed block diagram depiction of the electrostatic discharge circuit of FIG. 2, in accordance with an alternative embodiment of the present invention.

Turning now to FIG. 5, an alternative embodiment of the ESD clamping circuit 250 is illustrated. Similar to the circuitry illustrated in FIG. 3, the ESD clamping circuit 250 illustrated in FIG. 5 provides for the additional feature of requiring a Vdd 305 rise of twice the threshold voltage in order to activate the clamping function. Similar to the ESD clamping circuit 250 described above, the ESD clamping circuit 550 illustrated in FIG. 5 provides a first time-constant-circuit 330 and a second time-constant circuit 340. The device 550 comprises a threshold device 510 that is coupled to the inverter circuit 320. The source terminal of the threshold device 510 is coupled to the Vdd signal 305 on the line 315. Additionally, the threshold device 510 provides for requiring a voltage of two times the threshold voltage on the line 315 before the inverter circuit 320 activates the clamping device 310 for implementing the ESD clamping function. The first and second time-constant circuits 330, 340 are capable of toggling the inverter circuit 320 in order to activate or de-activate the clamping device 310. A more detailed illustration of the circuitry associated with one embodiment of the block diagram depiction of the ESD clamping circuit 250 is illustrated in FIG. 6.

Figure 6:
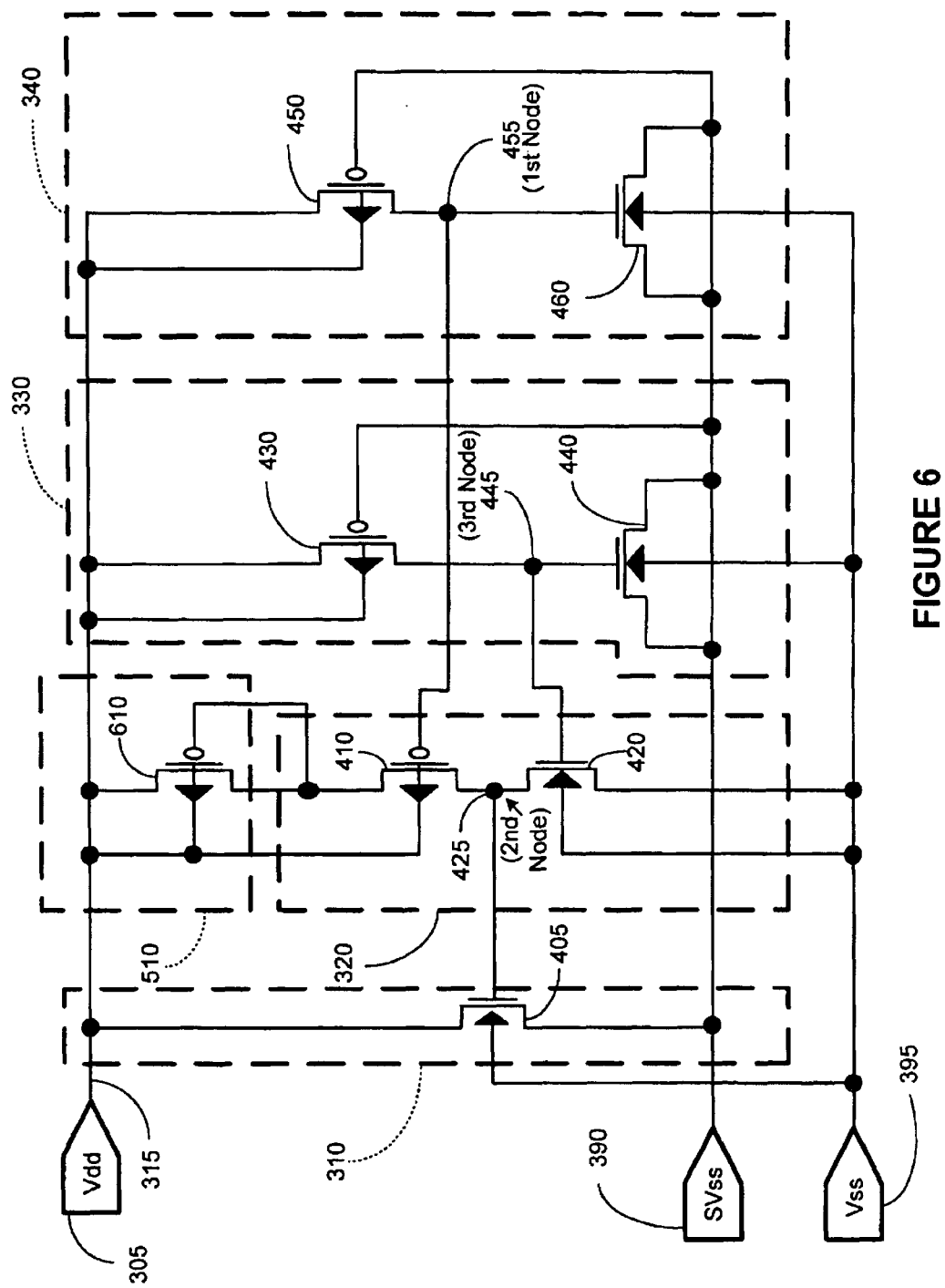
FIG. 6 illustrates a circuit diagram of the electrostatic discharge circuit of FIG. 5, in accordance with an alternative embodiment of the present invention.

Turning now to FIG. 6, an alternative embodiment of the ESD clamping circuit 550 is illustrated. The circuit in FIG. 6 includes a threshold transistor device 510 to provide a more stringent voltage-rise requirement to invoke the clamping function of the ESD clamping circuit 550. In one embodiment, the threshold transistor device 510 comprises a P-channel MOSFET device 610. The drain terminal of the threshold transistor device 610 is coupled to the gate terminal of the threshold transistor device 610 and to the source terminal of the transistor 410 in the inverter circuit 320. The source terminal of the threshold transistor device 610 is coupled to the Vdd signal 305, on the line 315. The threshold transistor device 610 prevents the inverter circuit 320 from activating the clamping device 310 until the voltage level on the line 315 reaches at least twice the threshold voltage. Embodiments of the present invention may be modified by those skilled in the art having benefit of the present disclosure to activate the clamping function at a variety of voltage levels and remain within the spirit and scope of the present invention.

The clamping device 310 is influenced by the operation of the inverter circuit 320, which comprises a P-channel transistor 410 and an N-channel transistor 420. The drain of the P-channel transistor 410 is coupled to the drain of the N-channel transistor 420. The intersection of the drain terminals of the transistors 410 and 420 provide a second node 425. The signal on the second node 425 enables or disables the clamping function by controlling the operation of the clamping device 310. In one embodiment, the clamping device 310 is a N-channel MOSFET device 405 with a large current drive width-to-length ratio capable of clamping an ESD pulse to a voltage level that will not damage the IC device.

The first time-constant circuit 330 includes a relatively weak P-channel pull-up transistor 430, the drain terminal of which is pulled up to the Vdd signal 305 on the line 315. The first time-constant circuit 330 also comprises a capacitance circuit 360, which includes a transistor 440. The second time-constant circuit 340 comprises a relatively weak P-channel pull-up transistor 450 the drain terminal of which is pulled up to the line 315. Additionally, the second time-constant circuit 340 comprises a second capacitance circuit 380, which includes a transistor 460. If an ESD event occurs, the ESD clamping circuit 550 experiences the ESD event and a Vdd signal 305 rises relatively quickly, while a first node 455 is held at the logic low level of SVss 390 and Vss 395 by the capacitance of the transistor 460.

When the Vdd signal 305 rises quickly due to the ESD event, and the first node 455 is initially held low, the first and second capacitance circuits 360 and 380 are initially discharged. The first node 455 is held low due to the capacitive circuit 380 (460). As a result, the transistor 410 in the inverter circuit 320 becomes turned on when the Vdd signal 305 rises above two P-channel thresholds. The transistor 420 in the inverter circuit 320 is initially turned off because a third node 445 would still be uncharged. The transistor 410 will turn on and will generally pull up the second node 425 to logic high, which turns on the clamping device 310; thereby enabling the clamping function.

After the clamping function has been turned on and the value of Vdd 305 is above one P-channel threshold voltage, the second time-constant circuit 340 will start to trickle current down the drain of the transistor 450 into the gate of 460 in the second time-constant circuit 340. The time-constant for the second time-constant circuit 340 is such that the rise in the current due to the ESD event is trickled out relatively quickly. Therefore, the first node 455 rises fairly rapidly as compared to the third node 445 due to the larger time-constant of the first time-constant circuit 330. The first node 455 rises up to logic high and turns off the transistor 410 since it is connected to the gate terminal of the P-channel transistor 410. However, the second node 425 has already been pulled up high enough to activate the clamping device 310 enabling the clamping function. So, turning off the transistor 410 does not affect the second node 425 from activating the clamp so the clamping function stays on even though the transistor 410 has been turned off.

The second time-constant circuit 340, which comprises the transistors 450 and 460, in combination, is used to determine the startup and the activation of the clamping function. The second time-function circuit 340 determines how fast an edge (of the rapid rise of a voltage level on the line 315) is required to turn on the clamping function. The embodiment of FIG. 6 will allow the clamping function to begin only after two times the threshold voltage has been reached on the line 315. In one embodiment, once the clamping function is activated by the device 310, it will generally stay on indefinitely until the N-channel device 420 is turned on. This would cause the discharge of the second node 425, which turns off the clamping function by turning off the clamping device 310. At some point after the Vdd signal 305 rises above one P-channel threshold, the first time-constant circuit 330 takes effect. The first time-constant is provided by the first time-constant circuit 330. The transistor 430 is generally a much weaker pull-up transistor as compared to the analogous transistor 450 in the second-time-constant circuit 340. Additionally, the capacitance provided by the device 440 is larger than the capacitance provided by the device 460. Therefore, the first time-constant circuit 330 provides a larger time-constant as compared to the time-constant constant provided by the second time-constant circuit 340. The first time-constant is larger and therefore allows the clamping function to stay on for long enough to fully discharge an ESD event.

In the case where there is a hot-plugging or a hot-socket event, in which results in a fast rise of Vdd 305 on the line 315 is experienced, the rising edge is not as fast as an ESD event as a result of the capacitance or inductance in the line 315. Therefore, the ESD clamping circuit 550 will not treat this voltage rise as an ESD event. In this case, it is desirable that the ESD clamping function of the circuit 550 is not activated. In the event of a hot plugging or a hot socket event where a relatively slow rise of Vdd 305 occurs, the first and third nodes 455, 445 are initially discharged when the level of Vdd 305 is above one threshold voltage. The transistor 450 then begins trickling current into the capacitor device 460. If the rise in the Vdd 305 is slow enough, then the device 460 starts to charge up the first node 455 and therefore, the transistor 410 does not experience the two threshold voltage drops between Vdd (on the line 315) and the first node 455, to be able to turn on. Therefore, the device 410 is not capable of pulling up the second node 425 to logic high.

Since the second node 425 is not pulled up to logic high, the clamping device 310 will not become activated. Additionally, the clamping function is not inadvertently activated later even if the second node 425 were to be pulled up by parasitic capacitances or resistances since the second node 425 would be actively pulled down by the transistor 420 when the device 440 charges up past one threshold. Therefore, utilizing the circuits provided in FIGS. 3-6, the ESD clamping devices 250 or 550 are capable of discriminating between an ESD event and a hot-plugging or a hot-socket rise in power. Therefore, the discrimination made by the ESD clamping circuit 250 is such that the clamping function is only activated for an ESD event and the clamping function is maintained until the ESD event is discharged.

Utilizing embodiments of the present invention, a more efficient and accurate method of clamping and discharging ESD events is provided. Embodiments of the present invention provide for at least a dual time-constant circuit design where one time-constant may be used to discriminate between a positive ESD event and a rise in the power due to a power-on, hot socket, or, hot plugging event. Additionally, the second time-constant may be utilized to engage the clamping function to a desired time period to adequately discharge a positive ESD event. Furthermore, embodiments of the present invention may be used to require an even higher level of energy surge such as double the threshold voltage rise before the ESD clamping function is implemented or activated. Therefore, a more efficient and accurate method of implementing an ESD function may be used to protect various electronic devices. Those skilled in the art having benefit of the present disclosure may also implement additional time-constant features to the present invention and remain within the scope and the spirit of the present invention. Additionally, those skilled in the art having benefit of the present disclosure may implement various thresholds before the ESD function is activated, and still remain within the spirit and scope of the present invention. Embodiments of the present invention may be utilized for a variety of electronic devices and integrated circuits.

The concepts taught by embodiments of the present invention can be utilized in a variety of electronic applications. The apparatuses 210, 220, 230 may be integrated in a system capable of transmitting and receiving signals having a voice band and a data band. The teachings of the present invention may be implemented in a line card that supports both POTS and ADSL technologies.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:

detecting a rise in a voltage level;

providing a first time-constant to determine whether said rise in said voltage level is caused by an electrostatic event;

providing a clamping function to clamp said voltage level in response to a determination that said rise in said voltage level is caused by said electrostatic event; and providing a second time-constant to provide a time period for maintaining said clamping function for a period of time to substantially reduce said electrostatic event.

2. The method of claim 1, further comprising determining whether said rise in said voltage level is caused by at least one of said electrostatic events and a power up sequence.

3. The method of claim 2, wherein providing a clamping function to clamp said voltage level further comprises activating a clamping device based upon said determination that said rise in voltage level is caused by said electrostatic event and said rise in said voltage level is above a predetermined threshold voltage level.

4. The method of claim 3, wherein providing a clamping function to clamp said voltage level further comprises activating a clamping device based upon said determination that said rise in voltage level is caused by said electrostatic event and said rise in said voltage level is at least two time above a predetermined threshold voltage level.

5. The method of claim 1, wherein said first time-constant is greater than said second time-constant.

6. An apparatus, comprising:

a first time-constant circuit to detect an electrostatic event based upon a rise in a voltage level;

a circuit operatively coupled to said first time-constant circuit, said first time-constant circuit to activate said circuit in response to detecting said electrostatic event;

a clamping device operatively coupled to said circuit, said clamping device to clamp said voltage level response to said circuit being activated; and a second time-constant circuit operatively coupled to said circuit, said second time-constant circuit to activate said circuit and de-activate said clamping device after a period of time to substantially reduce said electrostatic event.

7. The apparatus of claim 6, wherein said first time-constant circuit to provide a first time-constant for determining whether said rise in said voltage level is a result of at least one of said electrostatic events and a power up sequence.

8. The apparatus of claim 7, wherein said first time-constant circuit further comprises a first high resistance pull-up and a first capacitance circuit to provide said first time-constant.

9. The apparatus of claim 8, wherein said first high resistance pull-up further comprises a P-channel MOSFET device, wherein a source terminal of said P-channel MOSFET device is electrically coupled to said line carrying said voltage level.

10. The apparatus of claim 9, wherein said first time-constant circuit further comprises a first capacitance circuit electrically coupled to said drain terminal of said first high resistance pull-up, said first capacitance circuit in combination with said high resistance pull-up to provide said first time-constant.

11. The apparatus of claim 6, wherein said second time-constant circuit to provide a second time-constant for maintaining a clamping function for clamping said voltage level for a period of time for substantially extinguishing said electrostatic event.

12. The apparatus of claim 11, wherein said second time-constant circuit further comprises a second high resistance pull-up and a second capacitance circuit to provide said second time-constant.

13. The apparatus of claim 12, wherein said second high resistance pull-up further comprises a P-channel MOSFET device, wherein a source terminal of said P-channel MOSFET device is electrically coupled to said line carrying said voltage level.

14. The apparatus of claim 13, wherein said second time-constant circuit further comprises a second capacitance circuit electrically coupled to said drain terminal of said second high resistance pull-up, said second capacitance circuit in combination with said high resistance pull-up to provide said second time-constant.

15. The apparatus of claim 6, wherein said inverter circuit further comprises:
 a P-channel MOSFET device, wherein a source terminal of said P-channel MOSFET device is electrically coupled to said line carrying said voltage level; and
 an N-channel MOSFET device, wherein a drain terminal of said N-channel MOSFET device is electrically coupled to a drain terminal of said P-channel MOSFET device, forming a node that is capable of controlling an operation of said clamping device.

16. The apparatus of claim 15, wherein a signal from said first time-constant circuit is electrically coupled to a gate node of said P-channel MOSFET device to control said inverter and a signal from said second time-constant circuit is electrically coupled to a gate of said N-channel MOSFET device to control said inverter.

17. The apparatus of claim 15, wherein said clamping device is a N-channel MOSFET capable of clamping an ESD pulse to below a predetermined voltage level, said node is electrically coupled to a gate terminal of said clamping device and a drain terminal of said N-channel MOSFET device is electrically coupled to said line carrying said voltage level.

18. The apparatus of claim 16, wherein said clamping device is activated in response to said voltage level rising above a threshold voltage.

19. An apparatus, comprising:
 a first time-constant circuit to detect an electrostatic event based upon a rise in a voltage level;
 an inverter circuit operatively coupled to said first time-constant circuit, said first time-constant circuit to toggle said inverter circuit in response to detecting said electrostatic event;
 a clamping device operatively coupled to said inverter, said clamping device to clamp said voltage level in response to said toggling of said inverter circuit;
 a second time-constant circuit operatively coupled to said inverter circuit, said second time-constant circuit to toggle said inverter circuit to cause said inverter circuit to de-activate said clamping device after a period of time for substantially extinguishing said electrostatic event; and
 a threshold device operatively coupled to said inverter circuit, said threshold device to provide a higher voltage-rise requirement of said voltage level for said inverter circuit to activate said clamping device.

20. The apparatus of claim 19, wherein said first time-constant circuit to provide a first time-constant for determining whether said rise in said voltage level is a result of at least one of said electrostatic events and a power up sequence.

21. The apparatus of claim 20, wherein said first time-constant circuit further comprises a first high resistance pull-up and a first capacitance circuit to provide said first time-constant.

22. The apparatus of claim 21, wherein said first high resistance pull-up further comprises a P-channel MOSFET device, wherein a source terminal of said P-channel MOSFET device is electrically coupled to said line carrying said voltage level.

23. The apparatus of claim 22, wherein said first time-constant circuit further comprises a first capacitance circuit electrically coupled to said drain terminal of said first high resistance pull-up, said first capacitance circuit in combination with said high resistance pull-up to provide said first time-constant.

24. The apparatus of claim 19, wherein said second time-constant circuit to provide a second time-constant for maintaining a clamping function for clamping said voltage level for a period of time for substantially extinguishing said electrostatic event.

25. The apparatus of claim 24, wherein said second time-constant circuit further comprises a second high resistance pull-up and a second capacitance circuit to provide said second time-constant.

26. The apparatus of claim 25, wherein said second high resistance pull-up further comprises a P-channel MOSFET device, wherein a source terminal of said P-channel MOSFET device is electrically coupled to said line carrying said voltage level.

27. The apparatus of claim 26 wherein said second time-constant circuit further comprises a second capacitance circuit electrically coupled to said drain terminal of said second high resistance pull-up, said second capacitance circuit in combination with said high resistance pull-up to provide said second time-constant.

28. The apparatus of claim 19, wherein said inverter circuit further comprises:
 a P-channel MOSFET device, wherein a source terminal of said P-channel MOSFET device is electrically coupled to said threshold device; and
 an N-channel MOSFET device, wherein a drain terminal of said N-channel MOSFET device is electrically coupled to a drain terminal of said P-channel MOSFET device, forming a node that is capable of controlling an operation of said clamping device.

29. The apparatus of claim 28, wherein a signal from said first time-constant circuit is electrically coupled to a gate node of said P-channel MOSFET device to control said inverter and a signal from said second time-constant circuit is electrically coupled to a gate of said N-channel MOSFET device to control said inverter.

30. The apparatus of claim 28, wherein said clamping device is a N-channel MOSFET capable of clamping an ESD pulse to below a predetermined voltage level, said node is electrically coupled to a gate terminal of said clamping device and a drain terminal of said clamping device is electrically coupled to said line carrying said voltage level.

31. The apparatus of claim 19, wherein said threshold device comprises a P-channel MOSFET device, wherein a source terminal of said P-channel MOSFET device is electrically coupled to said line carrying said voltage level and a drain terminal of said P-channel MOSFET device is electrically coupled to said inverter circuit.

32. The apparatus of claim 31, wherein said threshold device to de-activate said clamping device until said voltage level reaches twice the level of said threshold voltage.

33. An apparatus, comprising:
 means for detecting a rise in a voltage level;
 means for providing a first time-constant to determine whether said rise in said voltage level is caused by an electrostatic event;
 means for providing a clamping function to clamp said voltage level in response to a determination that said rise in said voltage level is caused by said electrostatic event; and
 means for providing a second time-constant to provide a time period for maintaining said clamping function for a period of time to substantially extinguish said electrostatic event.

* * * * *